United States Patent [19]
Ledingham

[11] Patent Number: 5,967,295
[45] Date of Patent: *Oct. 19, 1999

[54] FLEXIBLE GUIDE RAIL SUPPORT POST

[75] Inventor: Stuart J. Ledingham, Coto de Caza, Calif.

[73] Assignee: Valu Engineering, Inc., Irvine, Calif.

[ * ] Notice: This patent is subject to a terminal disclaimer.

[21] Appl. No.: 09/179,726

[22] Filed: Oct. 13, 1998

Related U.S. Application Data

[63] Continuation of application No. 08/934,824, Sep. 22, 1997, Pat. No. 5,819,911.

[51] Int. Cl.$^6$ .................................................. B65G 21/20
[52] U.S. Cl. ............................................................ 198/836.3
[58] Field of Search ............................. 198/836.1, 836.2, 198/836.3

[56] References Cited

U.S. PATENT DOCUMENTS

| | | |
|---|---|---|
| 3,280,962 | 10/1966 | Stone et al. . |
| 3,776,350 | 12/1973 | Tice . |
| 3,800,938 | 4/1974 | Stone . |
| 4,470,499 | 9/1984 | Sijbrandij . |
| 4,502,594 | 3/1985 | Sijbrandij . |
| 5,322,160 | 6/1994 | Markiewicz et al. . |
| 5,492,218 | 2/1996 | Falkowski . |
| 5,782,339 | 7/1998 | Drewitz ................................. 198/836.3 |
| 5,819,911 | 10/1998 | Ledingham ........................... 198/836.3 |

OTHER PUBLICATIONS

Valu Guide® brochure pp. 10.4 A and B. Jul. 1994.
Valu Engineering, Inc. brochure showing SnapLock™ clips, 1994.

*Primary Examiner*—James R. Bidwell
*Attorney, Agent, or Firm*—Knobbe, Martens, Olson & Bear, LLP

[57] ABSTRACT

A flexible guide rail support post comprises a support bracket for mounting to a frame element, a guide element secured to the support bracket, and an actuating member extending through the guide element and having a handle at one end and a guide rail clamp at the other end. A spring surrounds that portion of the actuating member between the handle and the guide element. The guide rail support is movable inwardly and outwardly via movement of the actuating member with respect to the guide element. The inner diameter of the guide element and the outer diameter of the actuating member are selected so that the actuating member and associated guide rail clamp is permitted to move in a range of directions. A spacer is provided for locking the actuating member in at least two fixed positions with respect to the guide element.

16 Claims, 3 Drawing Sheets

FLEXIBLE GUIDE RAIL SUPPORT POST

RELATED CASES

This application is a continuation of application Ser. No. 08/934,824, filed Sep. 22, 1997, U.S. Pat. No. 5,819,911.

BACKGROUND OF THE INVENTION

1. Field of the Invention

The present invention relates in general to guide rail assemblies used in assembly line and conveyor belt systems and, in particular, to an improved means for supporting and adjusting the position of a guide rail.

2. Description of the Related Art

Guide rails are used to direct the travel of articles along a predetermined path of an assembly line or conveyor system. The articles are conveyed on a belt or track during the processing and packaging procedures of a typical manufacturer. Dependable support and adjustment of the guide rails is important to ensure manufacturing efficiency and to prevent the articles from tipping over or falling off the conveyor system.

Typically, whenever a different article travels through the conveyor system, the guide rails must be adjusted to accommodate the specifications of that article. This entails adjusting the guide rails to certain horizontal distances from the conveyor system. Guide rail support posts have been developed which partially permit this adjustment procedure, but do not allow this procedure to be readily repeatable. That is, each time a different article was conveyed, the horizontal distance calibrations had to be performed anew. Depending on the complexity of the adjustments, this procedure could require a significant amount of time and cause unnecessary manufacturing downtime.

This nonrepeatability problem has been partially addressed by U.S. Pat. No. 5,492,218 issued to Falkowski, which teaches a railing support post that can be adjusted among predetermined fixed positions along a single axis perpendicular to the guide rail which it supports. Falkowski comprises a bracket that retains a support post, an elongated central member that is supported by the support post and has a handle and clamp which are affixed on opposite ends thereof, and a spring loaded sleeve that transfers an applied force on the handle to a spring force on the clamp.

Linear adjustment of the central member, and thus the clamp, is accomplished by mounting individual spacers of varied length along the central member between the sleeve and the clamp. In particular, to move a guide rail inwardly with respect to a conveyor belt, a large spacer is positioned in the mounting area located between the clamp on the central member and the sleeve.

Although Falkowski partially solves the nonrepeatability problem through use of a guide rail support post which permits adjustment, it has significant shortcomings. Most notably, due to tight tolerances, the device permits adjustment of the guide rail position only in the single direction along the centerline of the sleeve and perpendicular to the length of the guide rail. In particular, the central member of the Falkowski device is permanently affixed inside the sleeve by a base and ring device, and the spring mechanism is located inside the sleeve but outside the central member. This design results in successive circumferential layering where the central member is surrounded by the spring, which is then surrounded by the sleeve. This layering enables the support post to be adjusted along the centerline or axis extending through the sleeve, but prevents movement of the support post along all other axes.

This limitation on the range of adjustment of the device is a significant problem. When a force is applied to the handle to move the central member of the Falkowski device, that same force acts on the guide rails. This force is perpendicular to the attached guide rails, contorting them perpendicularly to their secured positions. Because the guide rails are fixed at other points along their length, the attempt to move a single portion of the guide rail inwardly or outwardly perpendicular to its length is resisted, with the guide rail bending or bowing instead of moving linearly which is desired. This may cause permanent bending and even breaking of the tightly affixed guide rails. Alternatively, it prevents the user from moving the guide rail to its intended position.

A second shortcoming of Falkowski relates to its spacer design. Because each individual spacer has a predetermined length, a user is required to have on hand many spacers of different lengths whenever the guide rail support post is adjusted. The unavailability of just one requisite length spacer causes unnecessary manufacturing downtime. Moreover, the Falkowski device incorporates a detent along its surface to secure the spacer to the central member. Because of this detent, however, the spacer cannot be easily cut to specification. That is, once the manufactured spacer is extruded and bored, an additional step is required to create the detent along the surface. Since this additional step is impractical to perform at the conveyor site, the spacers must be delivered to the conveyor site in a final configuration, rather than as a long member which can be cut and customized at the conveyor site.

A need therefore exists for a guide rail support post that permits a user to quickly, easily, and adjustably locate the guide rail in more than one position.

SUMMARY OF THE INVENTION

In accordance with the present invention, a flexible guide rail support post is provided which permits easy adjustment of the guide rail. Preferably, the guide rail support post comprises a support bracket, an actuating member, an exterior spring, a guide element, and a clamping means.

The support bracket is demountably affixed to the conveyor. A cylindrical guide element is secured to the bracket and an actuating member, with a handle affixed to a rear end, is partially housed therein. An exterior spring is positioned about a portion of the actuating member between the handle and the guide element. A guide rail clamp is attached to a forward end of the actuating member, preferably with a bolt.

Flexible movement of the guide rail clamp is achieved by providing the actuating member with an exterior radius which is appreciably smaller than the interior guide element radius and by mounting the spring about the exterior of the guide element. This design avoids tight sleeving of elements and affords space between the elements to provide flexibility, or play, between the actuating member and guide element, permitting the actuating member to move over a range of directions other than simply along a centerline through the guide element. In particular, the actuating member may move in a range of directions, including linearly along a centerline through the guide element (and generally perpendicular to an attached guide rail), and off-linear directions angled with respect to this centerline (and thus at an angle other than perpendicular to the guide rail).

Therefore, when a force is applied to the handle to move the actuating member inwardly, the actuating member is allowed to move in a direction somewhat parallel to the length of the guide rail (i.e. along a path which is non-linear to the centerline through the guide element). The precise direction of movement is directed by a resistance force created by the guide rail. Movement of the actuating member along this angled, off-linear direction reduces guide rail contortion or bowing and accordingly reduces bending and breakage of the guide rail.

A further advantage of the present invention is that dual functioning spacers may be mounted along the actuating member to provide adjustment among predetermined fixed positions. Individual spacers maintain the support post in either a first or second mounting position, which allows one spacer to serve the function previously provided by several different spacers. Moreover, because the exterior surface of the spacer is flat, spacers may be cut and customized at the conveyor site from a much larger length spacer manufactured in an extruded manner. The spacer also includes a handle section for easy insertion and removal as well as a positioned hole through which a lanyard may be placed to secure the spacer to the support bar or bracket so that several spacers are readily available whenever guide rail adjustment is required.

DETAILED DESCRIPTION OF THE PREFERRED EMBODIMENTS

Figure 1:
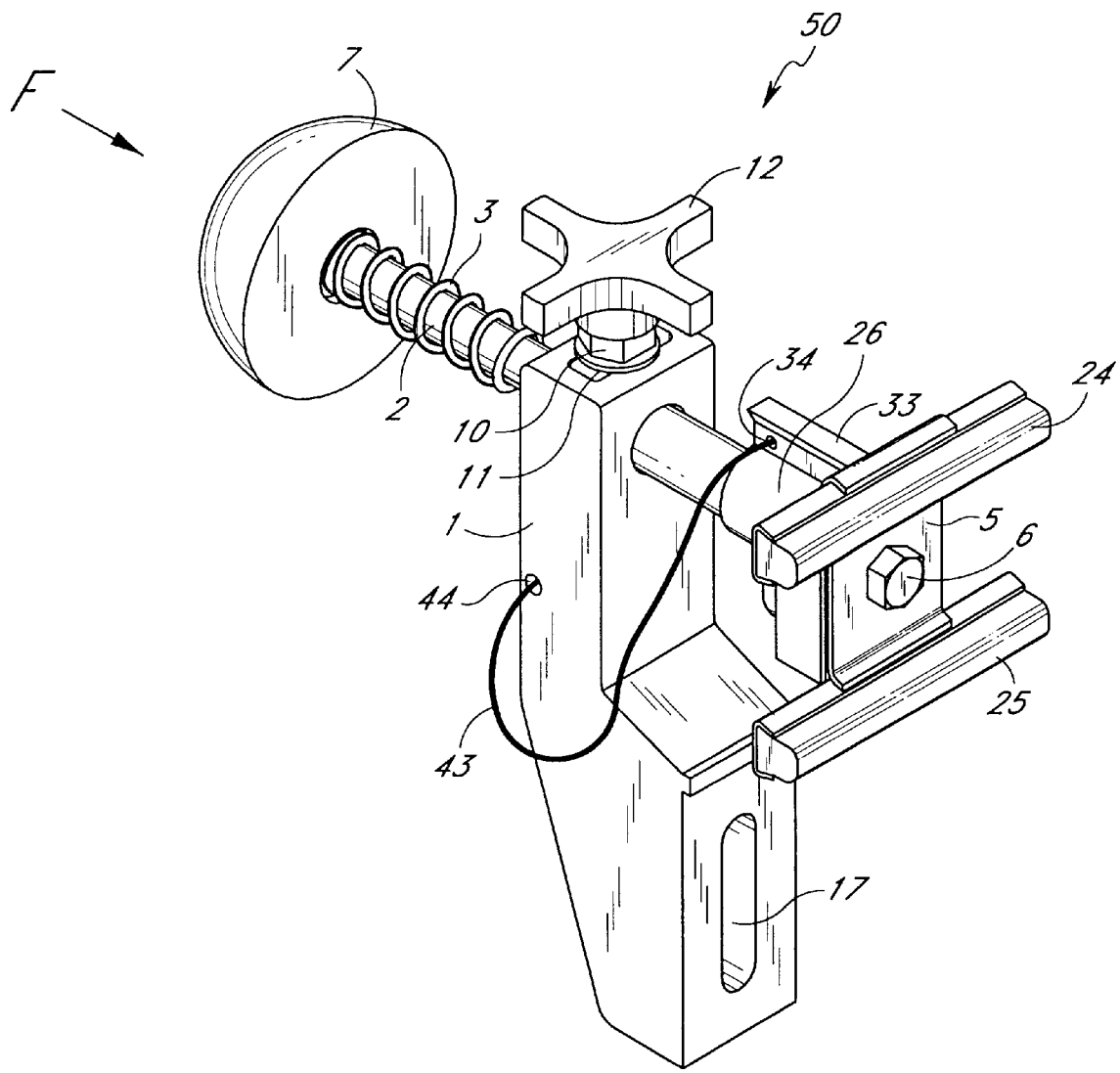
FIG. 1 is a front perspective view of a flexible guide rail support post with a spacer inserted in a first position in accordance with the teachings of the invention.
Figure 2:
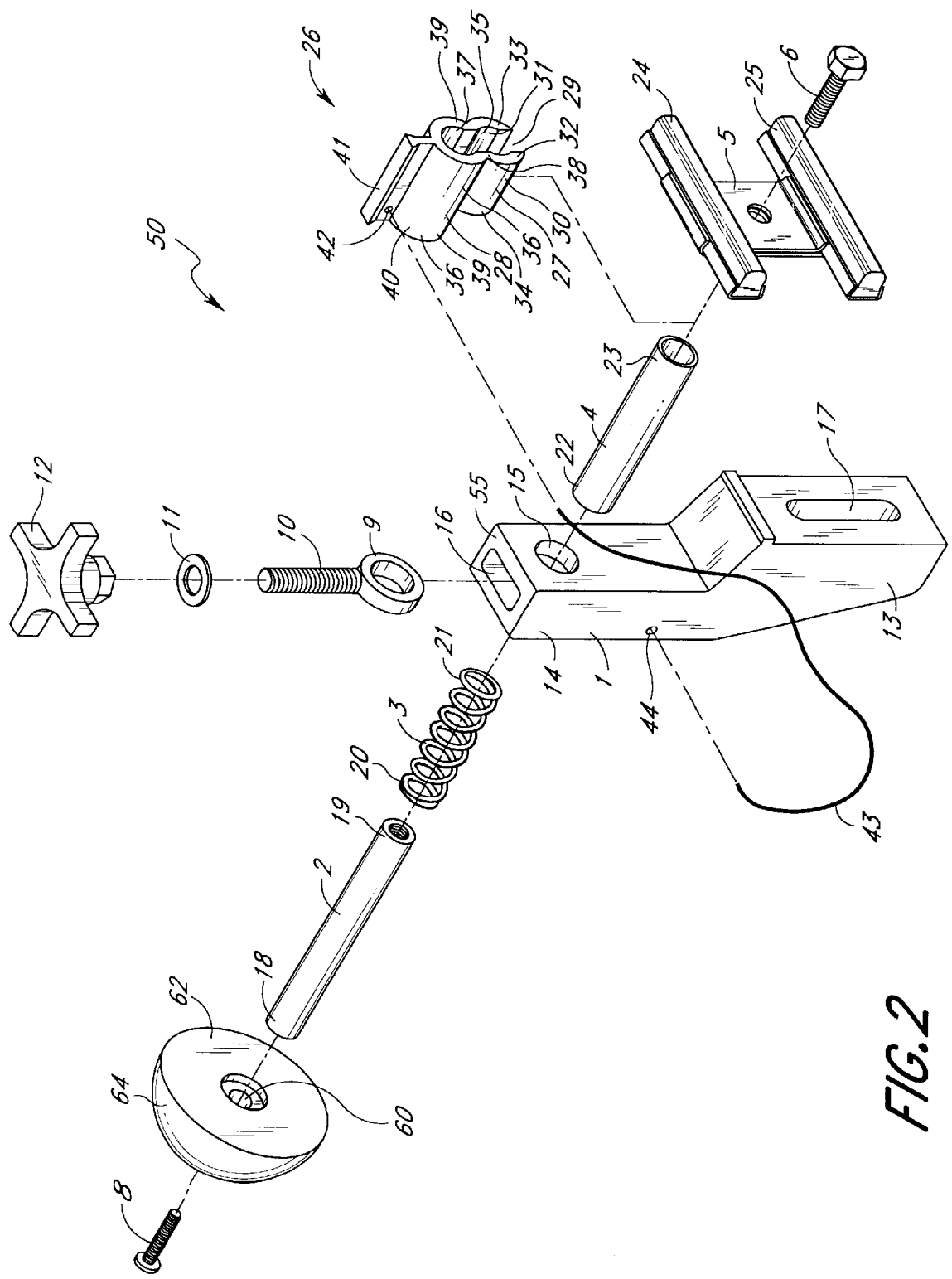
FIG. 2 is an exploded front perspective view of the support post illustrated in FIG. 1.

Referring to the drawings, and particularly to FIGS. 1 and 2, the present invention is a flexible guide rail support post 50 which is adapted to support one or more guide rails 24,25 in movable fashion. In particular, the support post 50 of the present invention is arranged to permit easy adjustment of the guide rail(s) 24,25.

The flexible guide rail support post 50 of the present invention is preferably comprised of a support bracket 1, an actuating member 2, an exterior spring 3, a guide element 4, and a guide rail clamping means 5. The cylindrical exterior spring 3 and cylindrical guide element 4 abut each other and encase the actuating member 2 to form a working member. Preferably, the actuating member is cylindrical, however, the actuating member may be manufactured in a wide variety of cross sectional configurations as will be easily understood by those skilled in the art. The working member is secured and positioned by the bracket 1.

A handle 7 is affixed to the rearward end 18 of the actuating member 2 and a guide rail clamping device 5 is affixed to the forward end 19 of the actuating member 2. Application of a force, F onto the handle 7 advances the forward end 19 of the actuating member 2 beyond the forward end 23 of the guide element 4 and compresses the spring 3. When the force F is removed, the spring force maintains the actuating member 2 to a resting position in which the clamping device 5 abuts the forward end 23 of the actuating member 3.

Means are provided for positioning and securing the actuating member 2 into a desired location in which its forward end 19 is extended outwardly beyond the forward end 23 of the guide element 4 so that a guide rail 24,25 is properly positioned. Preferably, this means comprises a spacer 26 mounted onto the exposed forward end 19 of the actuating member 2. In accordance with the present invention, a spacer 26 may be mounted in one or more positions and more than one spacer may be added or removed to allow adjustment among a variety of fixed positions. As may be appreciated by one skilled in the art, the movement of the actuating member 2 among these various positions effectuates movement of the guide rail clamp 5, and thus the guide rail(s) connected thereto, thereby changing the location of the guide rail(s).

As illustrated, the support post 50 includes a bracket 1 which has a lower end 13 and an upper end 14. The lower end 13 is demountably affixed to a conveyor frame or other support by a bolting mechanism 17 or other attachment mechanism as is known in the art. The exact means of support or attachment of the bracket 1 may vary dependent on the particular environment in which the device is used, as may be appreciated by one skilled in the art.

A first bore 15 preferably extends in a generally horizontal plane through the upper end 14 in a front to rear direction. The upper end 14 terminates at an end 55 of the bracket 1. A second bore 16 extends partially downwardly from the end 55 in a top to bottom direction generally perpendicular to the direction of the first bore 15. Preferably, the second bore 16 extends downwardly into the bar 1 at least a distance such that it intersects with the first bore 15.

A vertically oriented eye ring 9 preferably extends into the second bore 16, with an eyelet portion of the eye ring 9 positioned to pass through the second bore 16 without interrupting the first bore 15. The eye ring 9 includes an upwardly extending threaded bolt 10 section which extends beyond the end 55 of the support bar 1. A washer 11 surrounds the bolt 10 and rests on the end 55 of the bracket 1. A turn knob 12 is located above the end 55 of the bracket 1 and receives the bolt 10 incorporated into the eye ring 9 so that the washer 11 is secured between the turn knob 12 and eye ring 9. A clockwise force applied to the turn knob 12 pulls the bolt 10, and thus the eyelet portion of the eye ring 9 and a guide element 4 passing therethrough, upwardly. This binds the guide element 4 against the wall of the bracket 1 defining the bore 15 and secures the guide element 4 to the bracket 1. Alternatively, a counterclockwise rotational force applied to the turn knob 12 releases the guide element from the bracket 1.

The guide element 4 preferably extends into the first bore 15 in the bracket 1 with an actuating member 2 movably mounted inside the guide element 4. Preferably, the actuating member 2 comprises a tube constructed as a hollow cylindrical pipe with interior threading, however, as will be easily understood by one skilled in the art, the actuating member 2 may comprise a variety of cross sectional configurations adapted to extend through the guide element 4 in moving fashion, as described in more detail below.

The forward end 19 of the actuating member 2 is preferably demountably attached to a guide rail clamping means 5. Preferably, attachment is accomplished by passing a bolt 6 through the clamping means 5 and receiving the bolt 6 into the actuating member 2. It is contemplated that other demountable or permanent attachment means be used to affix the actuating member 2 to the clamping means 5 as will be easily understood by one skilled in the art.

The rearward end 18 of the actuating member 2 is preferably demountably attached to a handle 7. The handle 7 has a cylindrical bore 60 which extends in a generally horizontal plane in a front to rear direction with respect to the handle 7. Preferably, the actuating member 3 is then seated within the front end 62 of the bore 60 and demountably affixed to the handle 7 by a bolt 8 which is passed through the rear end 64 of the bore 60. It is contemplated that other demountable or permanent attachment means be used to affix the actuating member 2 to the handle 7. It is also contemplated that the spring 3 may be demountably or permanently affixed to the handle 7 for a variety of considerations, such as safety, as will be easily understood by one skilled in the art.

A guide element 4 preferably comprises a hollow cylindrical pipe extending through the first bore 15. The guide element 4 surrounds a portion of the actuating member 2, with a rearward end 22 thereof arranged to engage a forward end 21 of the exterior spring 3. The guide element 4 length is approximately one half the length of the actuating member 2 so that a forward end 23 of the guide element 4 extends past the forward end 19 of the actuating member 2.

Means are provided for biasing the actuating member 2 into a fixed position with respect to the guide element 4. Preferably, this means comprises an exterior spring 3 of conventional helical design. The spring 3, whose inner diameter is larger than the outer diameter of the actuating member 2, is positioned over and thus surrounds a portion of the actuating member 2. A rear end 20 of the spring 3 extends to the rear end 18 of the actuating member 2, abutting the handle 7. The spring 3 length, in its uncompressed state, is more than one half the length of the actuating member 2. As so constructed, when a clamping means 5 is attached to a forward end 19 of the actuating member 2 and positioned flush with the guide element 4, the spring 3 is slightly compressed. This spring force provides tension in the support bar 50 thereby securing the guide rails 24,25 in a fixed position as will be understood by those of skill in the art. Alternatively, the spring end 21 may abut up against the bracket 1.

Most importantly, an inner diameter of the guide element 4 is arranged to be appreciably larger than the outer diameter of the actuating member 2. In this manner, the actuating member 2, which extends therethrough as described in more detail below, is not constrained to move only linearly along a central axis extending through the guide element 4. Instead, the actuating member 2 may move outwardly or non-linearly, to the guide element 4 at an angle with respect thereto. Preferably, the actuating member 2 may be extended from the guide element 4 at an angle of at least 2 degrees on either side of a centerline through the guide element 4, more preferably at least 5 degrees, and most preferably greater than 5 degrees on either side of this centerline.

This non-linear movement ability of the actuating member 2 with respect to the guide element 4 is critical because, if the actuating member 2 is forced to move strictly in a linear direction, the guide rail 24,25 is forced to move in a direction perpendicular to its secured position. This maximizes the contortion angle between the secured guide rail lengths and the direction in which the guide rail 24,25 is moved to a perpendicular 90 degree angle, which accordingly causes maximum contortion or bowing of the guide rails. However, allowing the actuating member 2 to move in an off-linear direction allows the guide rail 24,25 to move in a direction that is non-perpendicular or angled to its secured position. The contortion angle is therefore not maximized at this non-perpendicular angle, which accordingly causes less than maximum contortion or bowing of the guide rails.

When assembled as explained above, the actuating member 2, spring 3, and guide element 4 form a working member, with the actuating member 2 surrounded on the forward end 19 by the guide element 4 and surrounded on the rearward end 18 by the spring 3.

In assembly, the working member is passed through the eye ring 9 and first bore 15 with the spring 3 toward the rear of the support bracket 1 and the guide member 4 toward the front of the bracket 1. When so positioned, the guide element 4 is demountably secured to the bracket 1 by a turn knob 12 located above the upper end of the bracket 1. The turn knob 12 receives the bolt 10 incorporated into the eye ring 9 and a washer 11 is placed between the turn knob 12 and the bolt 10. Application of a clockwise force applied to the turn knob 12 pulls the bolt 10, and thus the eyelet portion of the eye ring 9 and guide element 4 passing therethrough, upwardly. This binds the guide element 4 against the wall of the bracket 1 defining the bore 15, secures the working member to the bracket 1. Alternatively, a counterclockwise rotational force applied to the turn knob 12 releases the working member from the bracket 1. It is contemplated that other support brackets known in the art may be used to support, position and secure the working member and clamp 5 in operative relationship with the guide rails as will be easily understood by those skilled in the art.

The support post 50 incorporates a clamping means 5 which is preferably received into the forward end 19 of the actuating member 2. The clamping means 5 is arranged to secure a guide rail or rails 24, 25. In accordance with the preferred embodiment, the clamping means is arranged to secure upper 24 and lower 25 guide rails, however, there is no requirement that two guide rails be used. Rather, one or more guide rails may be used in the present invention as will be easily understood by one skilled in the art.

As described above, means are provided for fixing or positioning the forward end 19 of the actuating member 2 beyond the forward end 23 of the guide element 4, thereby permitting adjustment of a guide rail 24, 25 to a number of locations. Preferably, this means comprises a spacer 26 which may be mounted onto the front end 19 of the actuating member 2. When a force F is applied to the handle 7, the force advances the actuating member 2 and compresses the spring 3. The forward end 19 of the actuating member 2 is thereby exposed beyond the forward end 23 of the guide element 4 and capable of receiving a spacer 26.

The spacer 26 is preferably of unitary construction with an upper portion 28 and a lower portion 27. Preferably the spacer 26 is constructed of plastic for pliability, rigidity, and the ability to be cut as further detailed below, however, it is contemplated that metals, composites, or other similar materials be used as will be easily understood by those skilled in the art.

The lower portion 27 of the spacer 26 forms an arcuate parabolic curvature, preferably in a hollow semi-cylindrical design with an open bottom end 29 to form a lower channel 31. The interior dimension of the lower channel 31 is approximately equal to the maximum exterior dimension of the actuating member 2. The lower channel 31 preferably terminates with an interior ridge 32 on either side of the lower channel 31 to form a lower slot 70. The lower slot 70 has a dimension or width that is less than the maximum dimension or width of the lower channel 31. The spacer 26 is mounted onto the actuating member 2 by aligning the lower channel 31 over the forward end 19 of the actuating member 2 and applying a downward force thereto.

Because the interior dimension of the lower slot 70 is less than the maximum exterior diameter of the actuating member 2, when the spacer 26 is mounted thereon, the ridges 32 are spread laterally apart and the spacer 26 contorts or outwardly "gives" and thereby accepts the actuating member 2. When the actuating member 2 pops into the lower channel 31 past the ridges 32, an audible click is generated which an operator may hear and thereby understand that the spacer 26 has "clicked" into position and is secured in a first position. When a spacer 26 is secured in a first position, the forward end 33 of the lower portion 27 of the spacer 26 abuts the clamping means 5 and the rearward end 34 of the spacer 26 abuts the forward end 23 of the guide element 4.

The upper portion 28 of the spacer 26 similarly forms an arcuate parabolic curvature, preferably in a hollow semi-cylindrical design, with and an open bottom end 36 to form an upper channel 37. Preferably, the length of the upper portion 28 is approximately twice the length of the lower portion 27. The interior dimension of the upper channel 37 is approximately equal to the maximum exterior dimension of the actuating member 2. The upper channel 37 terminates with a ridge 38 on either side of the upper channel 37 to form an upper slot 35. The upper slot 35 has a dimension or width less than the maximum dimension or width of the upper channel 37. The spacer 26 is mounted onto the actuating member 2 by aligning the lower channel 31 over the forward end 19 of the actuating member 2 and applying a downward force thereto. As explained above, the spacer 26 may then be "clicked" into a first position.

Figure 3:
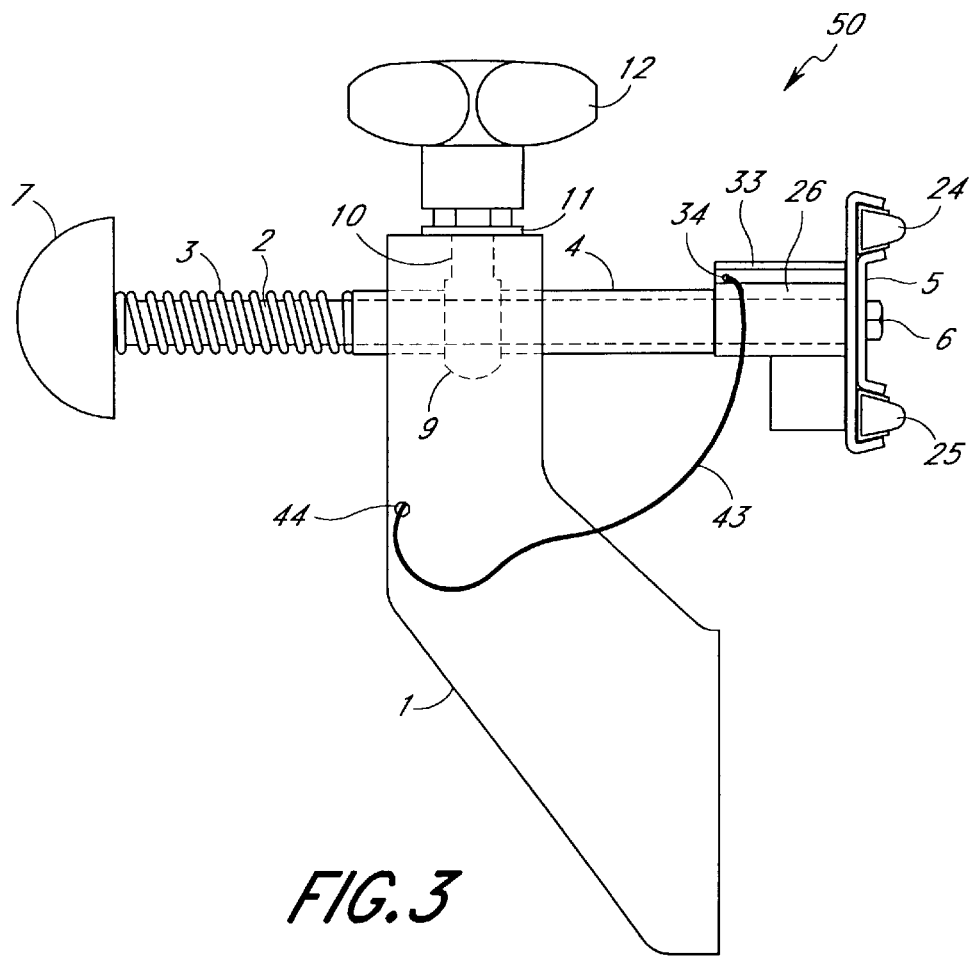
FIG. 3 is a side elevational view of the support post illustrated in FIG. 1 with the spacer inserted in the first position.
Figure 4:
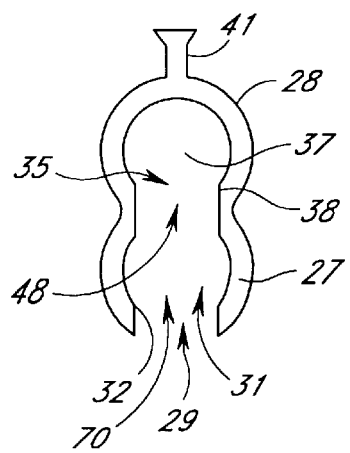
FIG. 4 is a front view of a spacer in accordance with the present invention.

From this first position, because the interior dimension of the lower slot 29 is less than the maximum dimension of the actuating member 2, when a force is again applied to the spacer 26, the ridges 38 are spread laterally apart and the spacer 26 contorts or outwardly "gives" and is thereby again accepted into the actuating member 2. When the actuating member 2 pops into the upper channel 37, past the ridges 38 an audible click is generated which an operator may hear and thereby understand that the spacer has "clicked" into position and is secured in a second position. (see FIG. 3). When a spacer 26 is secured in a second position, the forward end 39 of the lower portion 36 of the spacer 26 abuts the clamping means 5 and the rearward end 40 of the spacer 26 abuts the forward end 23 of the guiding element 4.

A handle 41 or similar member as will be easily understood by one skilled in the art is incorporated onto the upper portion 28 of the spacer 26. Preferably, the handle 41 is molded onto and along the upper portion 28 length to allow an operator to grasp the spacer 26, thereby permitting easy insertion and removal of the spacer 26.

Because the ridges 32,38 located on the spacer 26 secure the spacer 26 to the actuating member 2 there is no additional need to secure the spacer. Therefore, the forward and rearward ends 33,34,39,40 of the spacer 26 can be flat. This allows the spacer 26 to be manufactured in large extruded sections and then cut and customized at the conveyor site to provide exact spacer lengths.

By this design, an individual spacer 26 may be used in either a first position, wherein the spacer 26 is mounted over the actuating member 2 with the actuating member 2 extending through the lower channel 31, or in a second position, wherein the spacer 26 is mounted over the actuating member 2 with the actuating member 2 extending through the second channel 37.

In this arrangement, the spacer 26 may thus be used to adjust the position of the actuating member 2 into two positions with respect to the guide element 4. This is advantageous, since the single spacer 26 thus serves the purpose of two spacers of prior art design. This eliminates the need for such a large number of spacers, lowering the cost of doing business. This arrangement also prevents the occurrence of having the wrong sized spacer associated with a guide rail support, requiring time and energy to locate an alternate size spacer for a particular situation.

In addition, means are preferably provided for attaching the spacer 26 to the support bracket 1. Preferably, this means includes a hole 42 located on the handle 41 through which a first end of a lanyard 43 extends. An opposite end of the lanyard preferably extends through the hole 44 in the bracket 1. This arrangement connects the spacer 26 to the bracket 1, preventing it from becoming lost and yet still permits it to be moved with respect to the bracket 1.

In order to position the spacer a user presses on the handle 7 thus exposing the forward portion 19 of the actuating member 2. Thereafter the spacer 26 is positioned around the actuating member 2 so that the actuating member 2 is located in either of the channels 37,31. Finally, the handle is withdrawn thus securely positioning the spacer 26 between the clamp 5 and the guide element 4 as will be understood by those skilled in the art.

In the preferred embodiment, the actuating member 2 is approximately eight inches in length with an exterior radius of slightly less than one half inch. Both the exterior spring 3 and guide elements 4 are approximately four inches in length with an interior radius of slightly more than one half inch. The spacer 26 has an upper section 28 length of approximately one inch and a lower section 27 length of approximately one half inch.

The embodiments illustrated and described above are provided merely as examples of the flexible guide rail support post constructed in accordance with the present invention. Other changes and modifications can be made from the embodiments presented herein by those skilled in the art without departure from the spirit and scope of the invention, as defined by the appended claims.

What is claimed is:

1. A unitary spacer for use on an actuating member of a guide rail support post to position a guide rail with respect to a conveyor, said spacer comprising:
   a body;
   a first channel extending through said body, said first channel having a first length;
   a second channel extending through said body, said second channel having a second length,
   wherein the actuating member may be located in either said first channel or said second channel.

2. The spacer of claim 1, wherein said body has a hole for receiving a lanyard.

3. The spacer of claim 1, wherein said channels are partially rounded to receive the actuating member.

4. The spacer of claim 1, wherein said spacer further comprises a handle attached to said body.

5. A spacer as claimed in claim 1, wherein said first and second channels have the same cross-sectional configuration.

6. A spacer as claimed in claim 1, wherein said spacer has a plurality of ridges.

7. A spacer as claimed in claim 1, wherein said spacer is constructed of a rigid plastic.

8. A spacer as claimed in claim 1, wherein said lower channel forms a semi-cylindrical design.

9. A spacer as claimed in claim 1, wherein said lower channel terminates with an interior ridge on either side of said lower channel to form a lower slot.

10. A spacer as claimed in claim 9, wherein said lower slot has a width that is less than the maximum width of said lower channel.

11. A spacer as claimed in claim 1, wherein said spacer contorts when mounted onto said actuating member.

12. A spacer as claimed in claim 11, wherein a first end of said spacer abuts a clamping means and a second end of said spacer abuts a guide element when said spacer is mounted onto said actuating member.

13. A spacer as claimed in claim 1, wherein said spacer can be mounted onto said actuating member in a plurality of positions.

14. A spacer for use on a rigid member to position a guide rail with respect to a conveyor, said spacer comprising:

a body;

a first portion having a circumscribing boundary with an open end to form a first channel; and a second portion having a circumscribing boundary with an open end to form a second channel, wherein said rigid member may be arranged within said first channel or said second channel.

15. A spacer as claimed in claim 14, wherein said circumscribing body of said first and second portions has an arcuate parabolic curvature.

16. A spacer as claimed in claim 15, wherein said arcuate parabolic curvature has a semi-cylindrical geometric design.

* * * * *